Oct. 17, 1933. A. A. DICKE 1,931,464
THERMOSTAT
Filed April 8, 1930  3 Sheets-Sheet 1
Fig. 1
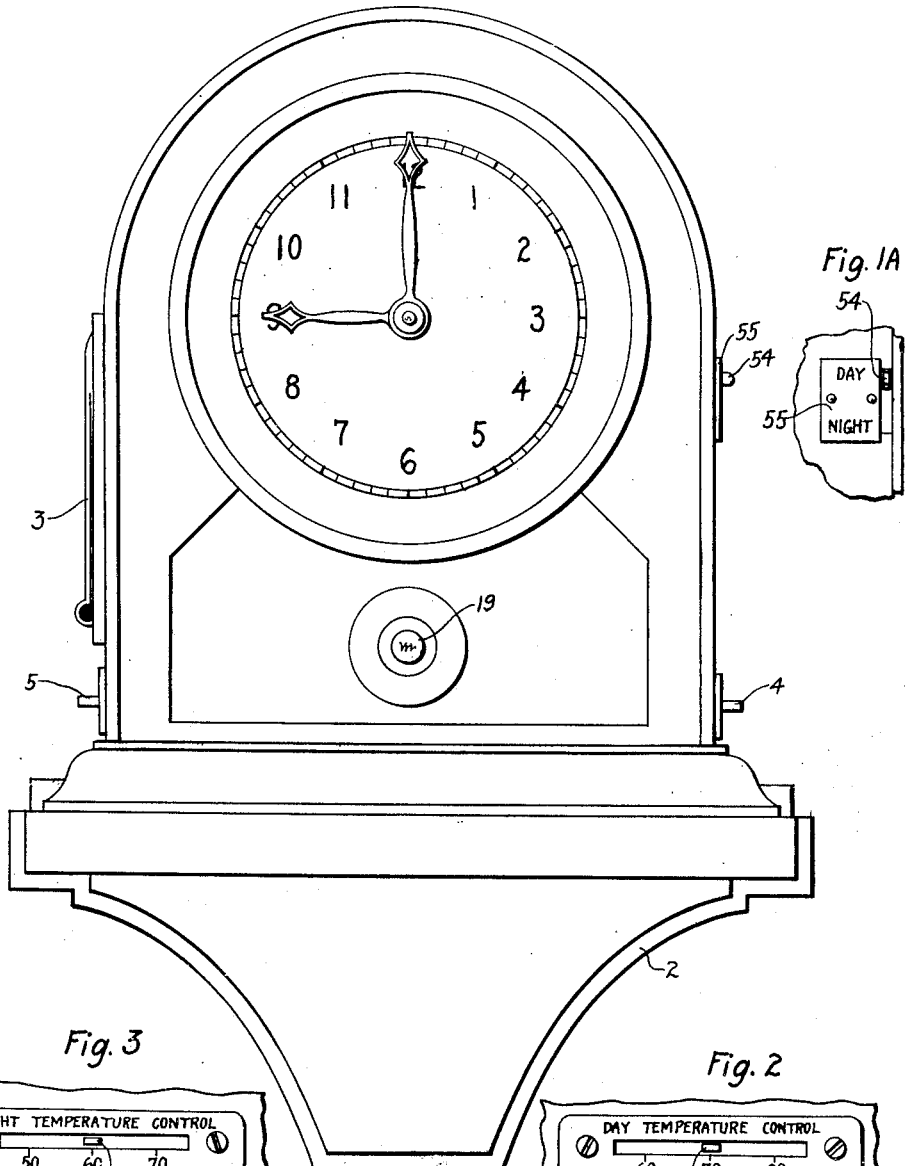
Fig. 1A
Fig. 3
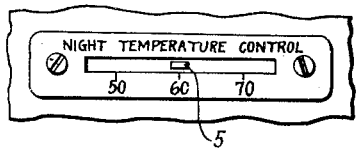
Fig. 2
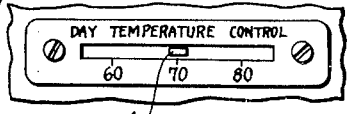
INVENTOR.
ALLEN A. DICKE
BY Oscar H. Dicke
ATTORNEY Oct. 17, 1933.  A. A. DICKE  1,931,464
THERMOSTAT
Filed April 8, 1930   3 Sheets-Sheet 2
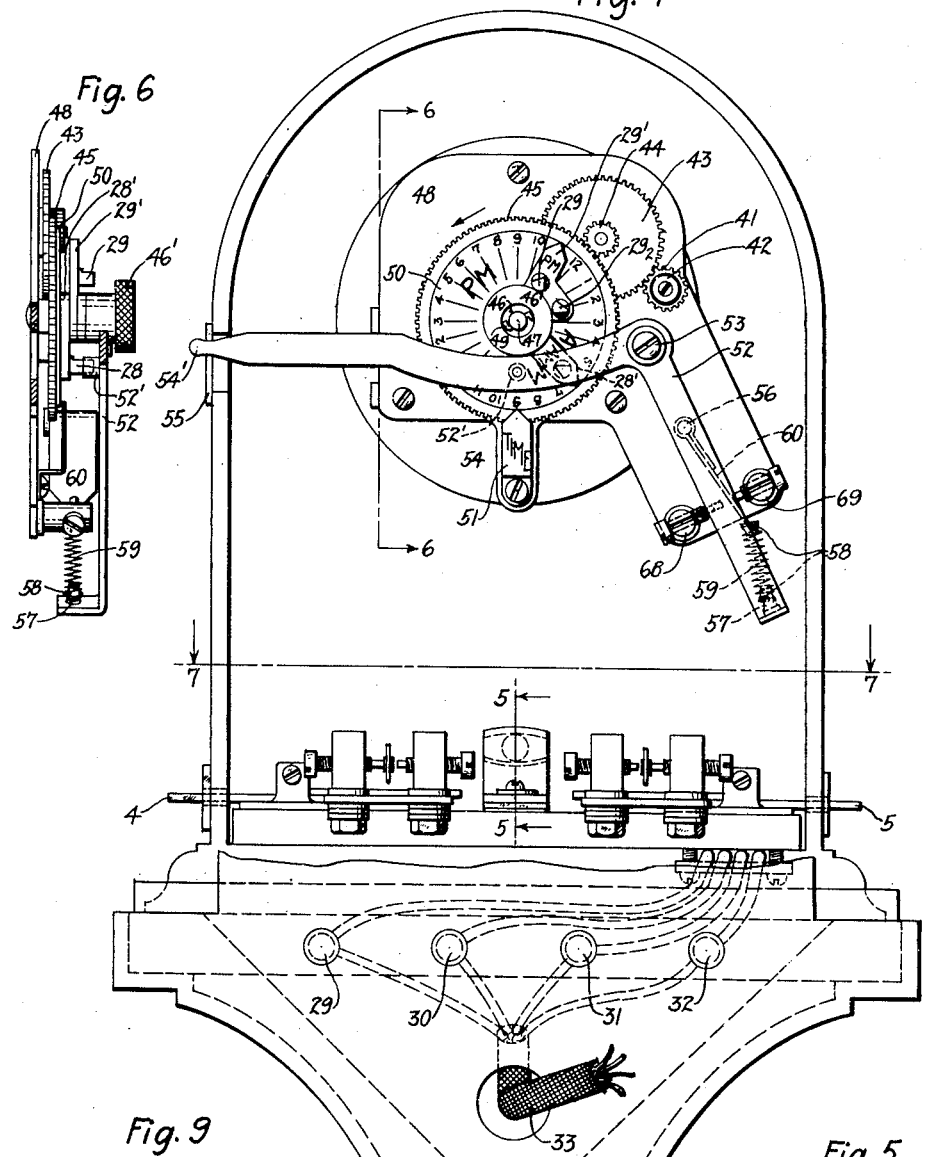
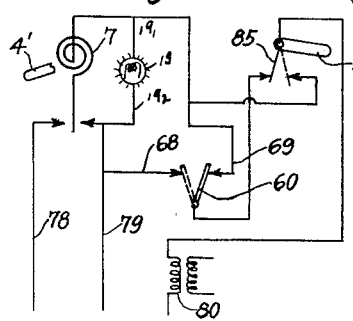
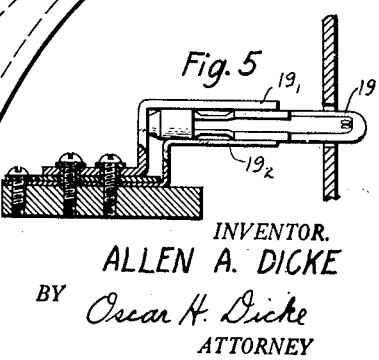
INVENTOR.
ALLEN A. DICKE
BY Oscar H. Dicke
ATTORNEY Oct. 17, 1933.　　　A. A. DICKE　　　1,931,464

THERMOSTAT

Filed April 8, 1930　　　3 Sheets-Sheet 3

INVENTOR
ALLEN A. DICKE
BY
Oscar H. Dicke
ATTORNEY

Patented Oct. 17, 1933

1,931,464

UNITED STATES PATENT OFFICE 1,931,464

THERMOSTAT

Allen A. Dicke, Montclair, N. J., assignor to Pioneer Heat Regulator Corporation, a corporation of New Jersey Application April 8, 1930. Serial No. 442,711

14 Claims. (Cl. 236—46)

This invention relates to automatic furnace regulators, and more particularly to clock mechanism for shifting the control mechanism of such regulators from day to night control, and vice versa.

In the provision of automatic control for furnaces, it has been found expedient to automatically reduce the temperature to a predetermined low value, or close the furnace entirely, during the sleeping hours of the night, and to open the furnace in time to have the dwelling warm upon rising. It is very common in this art to provide a clock associated with a thermostat for the purpose of setting the thermostat for a higher temperature in the morning and in some cases to also set it for a lower temperature at night. In every instance, however, insofar as the applicant is aware, these devices all have a distinctive funtional appearance, i. e., the appearance is such that the device is readily recognized as a thermostat. It is an object of the present invention to provide a thermostat controlling clock having the appearance of an ordinary mantel or shelf clock, the thermostat being located adjacent to or remote from the clock.

A further object is to provide a clock controlled thermostat housed in a casing having the apearance of an ordinary mantel or shelf clock.

A further object is to provide a supporting shelf for such a device provided with suitable electrical connections for connecting the thermostat mechanism with the heat source control device located at a distance, usually in the basement.

Another object is the provision of suitable ventilating openings or passages in the bottom of said clock casing and in said shelf to allow circulation of air to the temperature responsive element of said thermostat or thermostats.

A further object is to avoid irregular operation of the thermostats due to heat generated by the clock motor.

Another object is to provide an arrangement of a clock motor and thermostat within a clock casing such that the thermostat is not influenced by the heat generated by the clock motor.

A further object of the invention is to provide an arrangement of a clock motor and thermostat within a clock casing which promotes circulation of air at room temperature over the thermostat.

A further object is to provide such a temperature regulating control mechanism in which a plurality of thermoresponsive devices are provided for effecting control for different temperatures at different times under switch control.

A further object is to provide supplemental heating means adapted to slightly increase the temperature of the thermoresponsive means at certain times so as to provide for closer regulation of the temperature.

A further object is to provide a tell-tale light or other indicator to show when the regulating system is in a certain condition of adjustment.

Another object is to secure said heating effect and said indication by a single means, as by using a small electric lamp.

Further objects are to provide such suplemental heating means in a temperature regulating system which is normally static, i. e., where there are no parts in motion except when the combustion means are being adjusted from one rate of operation to another; to provide such supplemental heating in a thermostat of the type having a movable contact making element cooperating with a plurality of contacts to establish one of a plurality of circuits; to provide such supplemental heating and indicating means in a thermostat provided with an enclosing casing and generally to improve thermostats and heat regulating systems.

A further object is to secure the benefits of such an indicating means and such suplemental heat whether the "day" or "night" thermostat is in control.

While any suitable type of thermostat and regulating means therefor might be employed, in accordance with the present invention it is proposed to provide the clock with a 24 hour shaft for operating a double throw contact switch to switch the control mechanism from the day control to the night control circuit, and vice versa.

Another object is to provide a clock operated switching mechanism which will require a minimum amount of energy for operation and which can be operated manually at will.

A further object is to provide such a device having an electrically operated clock and to provide a suitable electric power source and connections therefor.

Other objects, purposes and characteristic features of the invention will in part be pointed out hereinafter and will in part be apparent from the description and accompanying drawings. In describing the invention in detail, reference will be made to the accompanying drawings in which:

Fig. 1 shows a front elevation of one embodiment of the present invention;

Fig. 1A is a partial side elevation;

Fig. 2 is a partial side elevation;

Fig. 3 is a partial side elevation of the opposite side of the casing;

Fig. 4 is a back view of the casing and shelf shown in Fig. 1, together with the apparatus mounted within the casing and shelf housing;

Fig. 5 is a vertical section taken on the line 5—5 of Fig. 4 as viewed in the direction of the arrows, illustrating the indicating light of the apparatus;

Fig. 6 is a partial view of the clock operated contact mechanism as viewed in the direction of the arrows on line 6—6 of Fig. 4;

Fig. 9 shows a modified wiring diagram of that part of the regulating system confined within the clock casing and employing only one thermostat.

Figure 7:
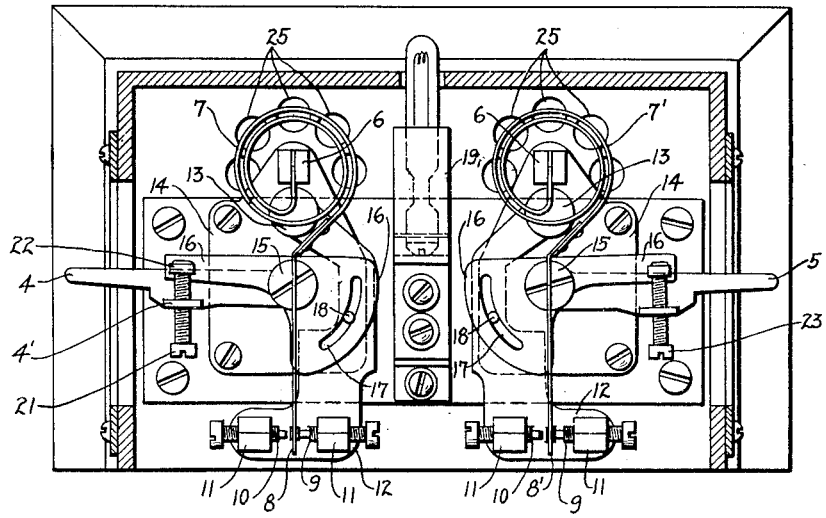
Fig. 7 is a cross sectional plan taken on the lines 7—7 of Fig. 4 as viewed in the direction of the arrows.

Referring to Fig. 1 of the drawings, a mantel clock casing 1, of the usual or any suitable construction, is shown supported on a hollow shelf 2; said casing preferably supporting on one side thereof a suitable thermometer 3. From the right hand side thereof is projecting an adjusting handle 4, of a suitable thermostat used for day temperature control, whereas from the left hand side thereof is projecting a handle 5 of a suitable night temperature control thermostat.

These thermostats, as shown, (see Fig. 7) comprise vertical posts 6 bifurcated and containing one end of spirally wound bi-metallic thermoresponsive elements 7 and 7', the free ends of which have attached thereto contact blades 8 and 8'. Changes in temperature will cause the thermoresponsive elements 7 and 7' to bend, thereby moving the contact arms 8 and 8' in a direction corresponding to the change in temperature.

These contact arms 8 and 8' are located between adjustable contact screws 9 and 10 mounted in split binding posts 11, so that the screw threads of the screws 9 and 10 fit snugly and frictionally in the threaded portion of the posts 11. These binding posts 11 are mounted on but insulated from a plate 12, which is pivotally held by the rivet 13 passing through it and the base plate 14. Means are provided for adjusting the thermostats for different temperatures as by moving said plates 12 and the contacts carried thereby relative to their respective contact blades 8 and 8'. Said adjusting means may be provided as follows:

To this base plate 14 is pivotally secured, as by a screw 15, an adjusting plate 16 provided with an arcuate slot 17. The contact posts supporting plate 12 has a pin 18 projecting therefrom which passes through the slot 17, the slot 17 being so shaped that rotation of the adjusting plate 16, through the medium of the handle 4 or 5, about its pivot 15 will cause similar rotation, but of a lesser extent, of the contact posts supporting plate 12 about its pivot 13. The adjusting plate 16 of the day temperature control thermostat is suitably and adjustably connected to the lever 4 (see Figs. 4 and 7), as by an adjusting screw 21 threaded in the ear 4' of the lever 4, and having its end riveted for free rotation in the ear 22 of the plate 16. This adjusting screw 21 is employed so that the lever 4 may be adjusted to, say, the 70 degree position on the scale shown in Fig. 2 when the thermostat contact 8 is mid-way between its cooperating contacts 9 and 10 while the room temperature is 70 degrees. The lever 5 is adjustably fastened to the adjusting plate 16 of the night temperature control thermostat by a similar adjusting screw 23.

These day and night thermostats are preferably mounted on the bottom plate within the clock casing, and attention is directed to the fact that suitable ventilating openings 25 are located directly below the thermostat spirals 7 and 7'. Air may circulate through these ventilating openings 25 in an upward direction through the medium of an opening 26 formed in the bottom of the hollow shelf 2, so that these thermostat elements 7 are exposed to actual room temperature. In this connection it is to be understood that the back cover of the clock (not shown) has a ventilating opening near the top. It will be noted that the positioning of the thermostats adjacent the bottom of the clock casing and beneath the clock motor and operating mechanism avoids the uncertainties and inaccuracies in the operation of the thermostats which would result if the thermostats were positioned above the clock motor due to heat generated by the clock motor and rising upwardly through the casing. Furthermore, this arrangement of the thermostats and clock motor within the clock casing results in effective circulation of air from the room through the casing by reason of the convection currents initiated by the upward flow of heated air about the clock motor. It will, of course, be apparent that the thermostats may in the alternative be positioned elsewhere in the casing provided they are sufficiently removed or shielded from the clock motor to prevent undesirable heating thereof by the clock motor.

The hollow shelf 2 is also provided with binding posts 29, 30, 31, and 32 for suitably connecting the wires leading from the clock winding motor 81, thermostats 7 and 7', and the indicating light 19, to a conduit 33, preferably contained within the wall on which the shelf 2 is mounted. In some cases it is desirable to have the mantel clock located at a point unsuitable for a thermostat location, such as over a fireplace, a radiator, or the like, and in this case the thermostat (Fig. 9) or thermostats (Fig. 8) are separately housed and are connected to the time switch of the mantel clock.

Means are provided whereby the "day" and "night" thermostats are brought in circuit for controlling the remote heat source regulating means. This comprises a double throw switch and means for actuating said switch in either direction at predetermined times by means of the clock works shown at 54'. This is preferably some commercial form of electric clock, the motor 81 of which is specially wound for low voltage current for convenience and safety in wiring. Said clock is provided with a resetting shaft carrying the resetting knob 42 and the pinion 41. This resetting shaft is connected with the clock hands which are frictionally connected with the clock train. The pinion 41 meshes with the gear 43 which carries the pinion 44 which meshes with the gear 45. The gear ratios are so selected that the gear 45 makes one revolution in 24 hours. The gear 45 is carried on a sleeve 46 journaled on a stud 47 fixed to the plate 48. The sleeve is permanently fixed against longitudinal movement on said stud by means of the pin 49. Integral with or attached to said gear 45 is the dial plate 50 bearing two series of numerals from 1 to 12—one set indicating A. M. hours and the other P. M. hours. The indicating pointer 51 indicates the time shown by the hands of the clock, the hands and dial plate having been synchronized by setting the hands during assembly to correspond with the time indicated by the pointer on the dial plate. After this adjustment has been once made it need never be repeated as the synchronism will never be disturbed. The pointer is also helpful in resetting the clock after an accidental stopping of the clock as it indicates whether the clock hands are showing an A. M. or a P. M. hour. The plate 48 may carry the switch lever 52 pivoted at 53 and formed with a combined indicator and operating handle 54' extending beyond the casing. This indicator projects adjacent the plate 55 bearing the words "day" and "night" as shown in Fig. 1A.

A suitable switch means is provided for bringing about an electrical connection between the switch lever 52 and either one of the contacts 68 and 69 supported on but insulated from said plate 48. The means shown is not only of the snap action type but serves to move the switch lever 52 to its "day" or "night" indicating position and to retain it there. This means comprises the switch blade 60 pivoted at 56 to the lever 52 and preferably located below said lever, as shown. The free end of said blade 60 is preferably pointed. Suitable spring means are provided between a pointed abutment 57 on said lever 52 and the point of said blade 60, which may consist of the coil spring 59 and the two conical seated members 58. In the position shown, the blade 60 bears against the contact 68. If now the switch handle 54 is slowly moved downwardly, either by hand or by the motion of the clock, as will be described presently, the blade 60 will be bearing against the contact 68 while the stud 56 and pivot point 57 will be moving to the right. This proceeds until the point of the blade passes the center line (from point 57 to the pivot stud 56), when the blade will snap from contact 68 to contact 69. The spring 59 instead of opposing the motion of the lever 52 will assist said motion and will complete it and hold the parts in the new position (night control).

In order to allow the clock to cause motion of said lever 52, means are provided as follows:

The lever 52 is provided with a downwardly extending stud 52', cooperating with the A. M. operating stud 28 and with the P. M. operating studs 29 and 29₂. The stud 28, which is preferably chamfered as shown is carried by an adjustable setting arm 28' and the studs 29 and 29₂, both being preferably chamfered as shown, are carried by the adjustable setting arm 29' both of which have a perforation receiving the 24 hour sleeve 46, which is threaded for the clamping nut 46'. In order to locate the A. M. stud 28 for the desired temperature raising hour and the P. M. stud 29 for the desired temperature lowering hour it is merely necessary to loosen the nut 46' and move the setting levers 28' and 29' so that their pointed outer ends will point to the desired hours as shown by the dial figures. In Fig. 4 the A. M. setting is for 6 A. M. and the P. M. setting for 11 P. M.

The stud 29₂ is provided for the following reason:

Suppose that the user intends to stay up later than eleven o'clock. At say 11:30, he may notice that the house is getting cool. Upon going to the thermostat he notices that the projection 54 is down (night control). He moves it up to day control, expected to move it down upon retiring at say one o'clock. If he forgets to do so the stud 29₂ will move the lever 52 down to night control at say 2 A. M. However, if the user should want to retire earlier than usual, say at 10 P. M., he has merely to move the projection down to night control. The projection 54 therefore serves as a combined indicator and setting lever. It will, of course, be evident that the stud 28 passes under the stud 52' lifting the lever 52 to "day" position and the stud 29 (and 29₂ if used) will pass over the stud 52' depressing the lever 52 to "night" position.

Figure 8:
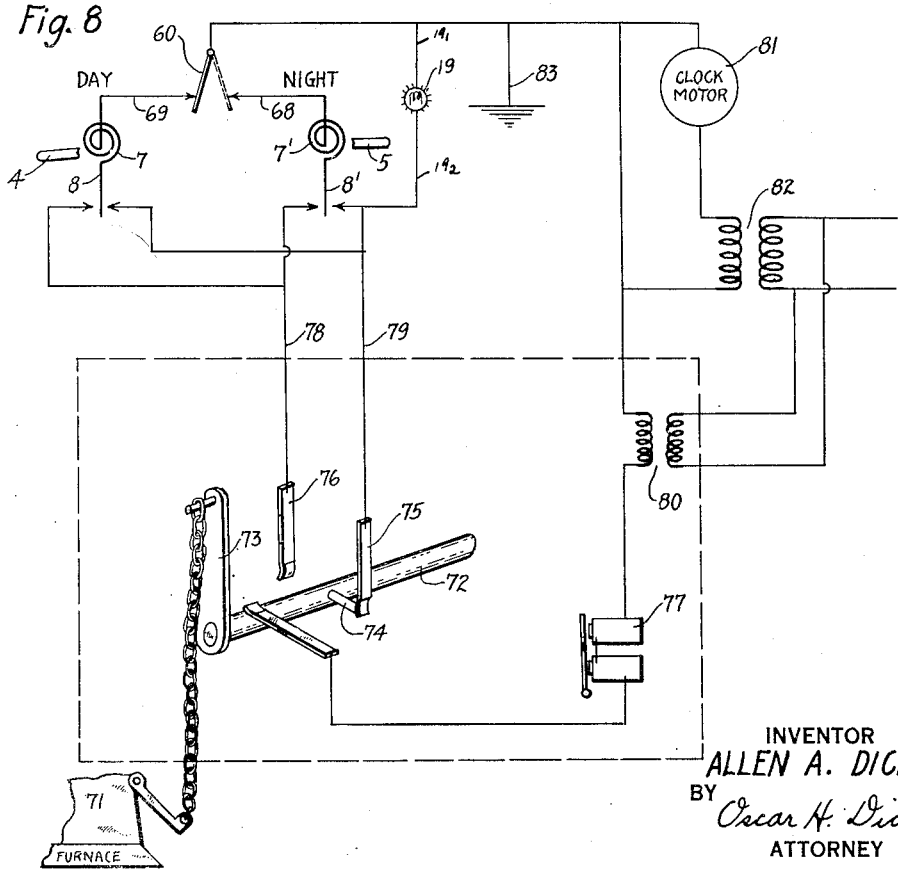
Fig. 8 illustrates the wiring diagram of one form of the present invention employing two thermostats.

Let us now observe how the time switch 60 is interconnected with the day temperature thermostat 7 and the night temperature thermostat 7'. Referring first to Fig. 4 it will be noted that the contact blade 60 is in the "day" temperature position. Referring now to Fig. 8 it will be noted that the contact blade 60 is in a position to connect the day temperature thermostat including the spiral bi-metallic coils 7 to the furnace regulator, conventionally shown by the shaft 72, the crank 73, movable contact arm 74, contact brushes 75 and 76, and the tripping magnet 77. This regulator may be of any well known type, such as the one shown in U. S. Patent to Mack, No. 680,262, August 13, 1901. Since the regulator itself is merely a conventional element in the present system, its exact construction is immaterial, it may however, be pointed out that the wire 78 is the draft opening wire and wire 79 is the draft closing wire, and that if current is caused to flow through the trip coil 77 through the medium of the wire 79, as by movement of the thermostat blade 8 toward the right to short circuit the pilot light 19, due to a rise in temperature, the furnace regulator will operate the crank 73 through an arc of 180 degrees, in which new position the furnace 71 is closed and in which it will be held until current flows through the same trip coil 77 through the medium of wire 78, in response to which the furnace regulator will operate through another arc of 180 degrees.

As shown, the tripping current for the furnace regulator is derived from the secondary winding of a transformer 80, and the clock winding motor 81 receives its current from the secondary winding of preferably a second transformer 82, the entire wiring system preferably being grounded to the clock as indicated by the wire 83. Although in the arrangement shown the clock is automatically wound by the winding motor 81 when required, a hand wound clock may be employed, if desired. It may be pointed out here, that the indicating lamp 19 shown in Figs. 5 and 8 of the drawings is a lamp of extremely low current consumption, so that if this lamp 19 is included in series with the trip coil 77 the current flow in this circuit is so small that the trip coil 77 will not be sufficiently energized to actuate its armature. The lamp 19 is located as shown and is held in position by the conducting spring clips 19₁ and 19₂. It is preferably connected in circuit as shown in Figs. 8 and 9, it being noted that it is effective in either position of the switch 60.

It will be noted that the lamp 19 is located near the thermocoil of both of the thermostats so that heat therefrom will affect both of said thermostats. The heat reaches the thermocoils by radiation, convection and/or conduction. The effect of said heat from said supplemental heat source is the same as in applicant's co-pending application S. N. 320,015 filed November 17, 1928. This heating effect is very advantageous in securing closer regulation. With thermostats of usual construction the contact points are set so as to require a temperature difference of 2 or 3 degrees Fahrenheit, and it is difficult to get a closer adjustment because closer adjustment may result in connecting the two contacts together. However, by the use of the present invention a very much closer adjustment can be secured without having a close adjustment of the contacts. Assuming that the contacts are set so that a three degree increase in temperature is required to cause the blade 8 (8') to move from the contact 10 to the contact 9 and that the heat from the heater element 19 is sufficient to raise the temperature of the thermoresponsive element 7 (7') two and three quarters degrees, it will be seen that the blade 8 (8') will touch the contact 9 upon only one-fourth degree temperature difference, which is much closer than could be obtained otherwise. This result is of great practical benefit as it permits of cheaper and less precise construction without sacrificing accuracy of operation. It will be noted that the lamp 19 is located in and behind an aperture in the front of the casing so that the light from the lamp is visible from outside and in front of the casing.

As indicated above, the arrangement of the thermostats and clock motor within the casing is such that the heat generated in the clock motor does not affect the operation of the thermostats and therefore the biasing action of the heating element 19 in raising the temperature of the thermostats is especially effective in maintaining close and accurate operation thereof.

Referring to Figs. 2 and 3 it will be noted that the mid-position of the thermostat lever 4 indicates say 70 degrees, whereas the mid-position of the thermostat lever 5 indicates 60 degrees, from which it will appear that as the time switch 60 (see Fig. 8) is moved from its normal to its dotted position the 60 degree thermostat is substituted for the 70 degree thermostat. It is of course understood that these thermostats may be adjusted within 10 degrees either above or below the middle position.

*Modified form shown in Fig. 9.*—Instead of using a day thermostat and a night thermostat, as indicated in Fig. 8, the night thermostat may be dispensed with, in which event operation of the time switch 60 to its dotted position (see Fig. 9) will operate the furnace to the furnace closing position, providing the double throw hand operated switch 85 assumes its normal position (the position shown). It sometimes happens that the user of the furnace regulator wishes to maintain day temperature until a very late hour. In this case, day temperature may be maintained automatically by moving the hand switch 85, having a handle 5' projecting from the side of the clock casing, to the dotted position, thus establishing an auxiliary circuit, readily traced in the drawings, for supplying electric current from the transformer 80 to the day thermostat 7. In other words, in the circuit arrangement shown in Fig. 9, with the manually operable switch 85 in the normal position, the time switch 60 when in "day" position allows the regulator 72—76 (see Fig. 8) to be controlled by the thermostat 7, but when in "night" position controls the regulator to the furnace closed position, but if this manually controllable switch 85 is moved to the dotted position the time switch 60 is cut out and the thermostat 7 is continuously effective to control the regulator 72—76.

I have herein shown and described certain embodiments of my invention for the purpose of explaining its principles and showing its application, but numerous modifications may be made without departing from the principles of the inventions, which modifications I intend to have embraced within the scope of the claims which follow.

What I claim is:

1. A thermostat for controlling the temperature of an apartment comprising a ventilated housing having means for ingress and egress of air, two thermoresponsive elements in said housing serving to maintain the apartment at either of two alternative temperatures, a contact operated by each of said elements, and an indicating lamp supported to be visible from the outside of said housing and controlled in turn by the contact of one or another of said elements, and switch means for rendering one or another of said elements effective.

2. A thermostat for controlling the temperature of an apartment comprising a ventilated housing having means for ingress and egress of air, two thermoresponsive elements in said housing serving to maintain the apartment at either of two alternative temperatures, a contact operated by each of said elements, and supplemental heat supply means mounted in heat transferring relation to each said thermoresponsive elements and controlled in turn by the contact of one or another of said elements.

3. In a thermostat for controlling means for varying the supply of heat to an apartment, a casing constructed to present the appearance of a conventional mantel clock, clock mechanism located therein and provided with conventional time indicating means visible outside of said casing, thermoresponsive means for controlling the heat supply varying means, and means whereby said thermoresponsive controlling means is controlled by said clock mechanism, in combination with a hollow supporting shelf for said casing, and electric conductor connecting means located in said hollow shelf.

4. A thermostat having in combination, a clock casing constructed to present the appearance of a conventional mantel clock, clock mechanism located therein and provided with conventional time indicating means visible outside of said casing, a thermoresponsive device controlling the supply of heat to an apartment located in said casing, a hollow supporting shelf for said casing and electric conductor connecting means within said hollow shelf whereby said shelf serves as a wiring junction box.

5. In combination, a casing provided with ventilating openings and having an electrically operated clock motor therein, a thermostat controlled by the clock motor located in said casing below the clock motor and means operated by said thermostat for controlling a furnace.

6. In combination, a casing having openings in the upper and lower parts of the casing for ventilation of the casing, an electrically operated clock motor in said casing, a thermostat controlled by said clock located below the clock motor and adjacent the opening in the lower part of the casing and means for controlling a furnace operated by said thermostat.

7. In combination, a clock casing having the appearance of a conventional mantel or shelf clock and provided with apertures in the upper and lower portions of the casing to permit the circulation of air therethrough and formed with an aperture in one of the lateral walls of the casing, a clock within said casing visible from the front thereof, an electric motor in said casing for operating said clock, thermostatic means positioned within said casing below said clock motor and adjacent the openings in the lower part of said casing whereby convection currents initiated by heat generated in said motor pass upwardly through the casing drawing in air at room temperature through the openings in the lower part of the casing and preventing the transfer of heat from the motor to the thermostats, furnace control means operated by said thermostats and a combination lamp and heating element positioned adjacent the thermostats to render operation of the thermostats relatively sensitive to variation in the room temperature, said lamp when lighted being visible through the opening in the lateral wall of the casing.

8. In combination, a shelf consisting of a box-like structure for supporting a clock and having a ventilating opening passing generally vertically therethrough, a clock casing on said shelf containing a clock and provided with a ventilating opening communicating with said shelf, a thermostat in said clock casing, furnace regulating means controlled by said thermostat, and binding posts within said shelf whereby said shelf affords ventilation for said clock casing and serves as a wiring junction box for conducting wires leading to such clock and to the furnace regulating means.

9. In a thermostat for controlling means for varying the supply of heat to an apartment, two thermo-responsive elements serving to maintain the apartment at either of two alternative temperatures, electric contact means operated by each of said elements, a casing formed with an aperture therein, enclosing said thermo-responsive elements and contact means and a combined indicating lamp and supplemental heat source controlled in turn by one or the other of said thermo-responsive devices and mounted adjacent said aperture so that light from said lamp is visible outside the casing.

10. The combination comprising furnace regulating means for controlling the temperature of a room, a thermostat responsive to variations in the temperature of the air in the room for controlling the furnace regulating means, a ventilated casing within which said thermostat is located, a clock connected to said thermostat for controlling the operation thereof and an electric motor for operating said clock located in said casing and serving to cause circulation of air at room temperature through said casing and over said thermostat.

11. The combination comprising a clock, an electric motor for operating said clock, furnace regulating means, thermo-responsive means for controlling said furnace regulating means, and a casing for said clock motor and thermo-responsive means having ventilating openings therein, said clock motor, thermo-responsive means and casing being so constructed and arranged that air entering said casing through said ventilating openings is caused to pass first into contact with said thermostat and thereafter to pass into contact with said motor whereby heat generated by said motor is carried out of said casing and away from said thermo-responsive means.

12. In combination with a furnace regulating means, a thermostat, a clock having an electric motor for operating the same, and a casing formed with a plurality of apertures therein, one of which apertures serves as an inlet through which air at room temperature enters said casing and another of which serves as an outlet through which air heated by said electric motor passes out of said casing, whereby a path for the flow of air through said casing is provided, said clock motor and thermostat being so located in said casing and so arranged in the path of flow of air from said inlet to said outlet apertures that air entering said inlet aperture passes first over said thermostat, then over said clock motor and thence through said outlet aperture.

13. In an electric clock thermostat, a casing formed with ventilating openings near its bottom and its top, a clock, an electric motor for operating said clock located within said casing, a thermo-responsive means controlled by said clock located in said casing below the motor whereby the heat generated by the motor will cause the air adjacent thereto to be heated and to rise upwardly out the ventilating opening at the top of said casing and thereby cause air at room temperature to be drawn into said casing through a ventilating opening near the bottom thereof and around said thermo-responsive means.

14. In combination, a clock casing having the appearance of a conventional mantel or shelf clock and provided with apertures in the upper and lower portions of the casing to permit the circulation of air therethrough, a clock within said casing, an electric motor in said casing for operating said clock and thermostatic means positioned within said casing below said clock motor and adjacent the openings in the lower part of said casing whereby convection currents initiated by heat generated in said motor pass upwardly through the casing drawing in air at room temperature through the openings in the lower part of the casing and preventing the transfer of heat from the motor to the thermostats.

ALLEN A. DICKE.